United States Patent
Collier

(10) Patent No.: US 6,766,464 B2
(45) Date of Patent: Jul. 20, 2004

(54) METHOD AND APPARATUS FOR DESKEWING MULTIPLE INCOMING SIGNALS

(75) Inventor: Josh D. Collier, Winchester, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 550 days.

(21) Appl. No.: 09/782,479

(22) Filed: Feb. 13, 2001

(65) Prior Publication Data

US 2002/0112099 A1 Aug. 15, 2002

(51) Int. Cl.$^7$ .................................................. G06F 1/04
(52) U.S. Cl. ....................... 713/503; 713/503; 713/400; 713/600; 710/56; 710/71; 710/305; 370/464; 327/158; 327/295; 327/565
(58) Field of Search ................................. 713/400, 503, 713/600; 710/56, 71, 305; 370/464; 327/158, 295, 565

(56) References Cited

U.S. PATENT DOCUMENTS

| | | | |
|---|---|---|---|
| 4,218,713 A | 8/1980 | Horak et al. | 360/36 |
| 4,993,026 A | 2/1991 | Yamashita | 370/100 |
| 5,185,736 A | 2/1993 | Tyrrell et al. | 370/55 |
| 5,241,543 A | 8/1993 | Amada et al. | 370/100.1 |
| 5,298,866 A | 3/1994 | Kaplinsky | 328/155 |
| 5,486,783 A | 1/1996 | Baumert et al. | 327/147 |
| 5,550,874 A * | 8/1996 | Lee | 375/354 |
| 5,579,352 A | 11/1996 | Llewellyn | 375/376 |
| 5,583,990 A * | 12/1996 | Birrittella et al. | 712/29 |
| 5,729,719 A | 3/1998 | Gates | 395/550 |
| 5,790,524 A | 8/1998 | Bennett et al. | 370/244 |
| 5,799,015 A | 8/1998 | Bennett et al. | 370/388 |
| 5,826,028 A | 10/1998 | Bennett et al. | 395/200.52 |
| 5,870,441 A | 2/1999 | Cotton et al. | 375/354 |
| 5,969,999 A * | 10/1999 | Lee | 365/194 |
| 6,002,882 A * | 12/1999 | Garde | 712/35 |
| 6,091,705 A | 7/2000 | Regula | 370/223 |
| 6,298,073 B1 * | 10/2001 | LeFever | 370/503 |
| 6,326,830 B1 * | 12/2001 | Brady et al. | 327/293 |
| 6,560,201 B1 * | 5/2003 | Amann et al. | 370/242 |
| 6,578,153 B1 * | 6/2003 | Sankey et al. | 713/400 |
| 6,675,327 B1 * | 1/2004 | Mobin et al. | 714/700 |
| 2001/0043648 A1 * | 11/2001 | Ducaroir et al. | 375/224 |

OTHER PUBLICATIONS

InfiniBand Trade Association, "InfiniBand Architecture Specification", Oct. 24, 2000, pp. 33–36, 98–102, 126–131, vol. 1 and 2 (XP–002202923).
Rich Hovey, "LSI Logic, The InfiniBand Enabler", Jul. 2000, pp. 1–15, (XP–002202924).
InfiniBand™ Architecture Specification, vol. 1, Release 0.9 Mar. 31, 2000, Published by InfiniBand$^{sm}$ Trade Association.
InfiniBand™ Architecture Specification, vol. 2A, Release 0.9 Apr. 7, 2000, Published by InfiniBand$^{sm}$ Trade Association.

* cited by examiner

*Primary Examiner*—Thomas Lee
*Assistant Examiner*—Nitin C. Patel
(74) *Attorney, Agent, or Firm*—Park, Vaughan & Fleming LLP

(57) ABSTRACT

An apparatus and method for compensating skew across a plurality of data interfaces includes using a recovered clock signal at an incoming clock rate to regulate output from a deskew interface. The recovered clock is drawn from one of the data interfaces and the data from all the data interfaces is deskewed to the recovered clock signal. A deskew buffer is provided for each data interface. Link logic may also be run in accordance with the recovered clock signal. Alternatively, the link logic may run at a local clock rate and an elastic buffer is coupled between the deskew interface and the link logic.

23 Claims, 4 Drawing Sheets

METHOD AND APPARATUS FOR DESKEWING MULTIPLE INCOMING SIGNALS

TECHNICAL FIELD

The present invention relates to a deskew mechanism and more particularly, a link receiving a plurality of signals at a same incoming clock rate subject to skew among the signals.

BACKGROUND ART

In computer networks, data is generally sent and received in data packets. Different networks have different size interfaces to facilitate data transfer to other nodes and other networks. These interfaces may include multiple parallel lanes for sending and receiving data packets. Some modes of communication over such interfaces use only one lane for transferring data packets. These interfaces have the lowest link bit rate of ×1 (times one) the data rate over a lane. Another mode uses four parallel lanes to provide a link bit rate of ×4 the data rate over a lane. Thus, for a data rate of 2.5 Gb/sec, data can be provided in the ×4 mode at 10 Gb/sec. Still other modes use twelve parallel lanes for transferring data packets to provide a link bit rate referred to as a ×12 link.

Data packets being transported over cables or otherwise between networks having a number of parallel lanes are subject to skew and clock intolerance. "Skew" generally occurs when parallel bits reach an interface, or communication link, at different times because of differing transmission delays over each given lane. As data packets are received, clock intolerance arises when the incoming clock rate differs from the clock rate of the receiving apparatus.

In the prior art, buffers have been commonly used as intermediate storage areas that compensate for differences in rates in data flow when information is received by one computer device from another. In system area networks, for example, elastic buffers are often used to compensate for clock differences. An elastic buffer is a first in first out ("FIFO") buffer that receives data at a variable input rate and outputs data at a variable output rate. In an elastic buffer, data can be inserted or removed at intervals identified by sequence signals in the data in a controlled manner to compensate for under runs or over runs of data resulting from the difference between the input rate and the output rate. Elastic buffers are typically used in each of a number of lanes.

Receive link logic manages all skip, training, and idle sequences in the data stream through the deskew queues and the elastic buffers. Skip sequences signal places along the data where a data packet may be omitted. Idle sequences indicate when there is no other data packet to transmit. Training sequences are identifiable sequences used to measure skew between the data lanes so that programmable delays may be determined and inserted to remove skew. If the receive link logic becomes overburdened by its tasks, there may be delays or errors in the data flow. Further, the elastic buffers may themselves cause skew when a skip sequence is lost or missed, such that retraining of the deskew function may be necessary.

SUMMARY OF THE INVENTION

An apparatus for compensating skew across a plurality of data interfaces includes a deskew buffer for each data interface. Data on each of the data interfaces arrives at a same incoming rate but in accordance with its own individual clock signal. A recovered clock signal is drawn from the clock signal of one of the data interfaces and coupled to all of the deskew buffers such that the data from all the data buffers is deskewed and output in accordance with the recovered clock signal. The apparatus may also include a link logic device that has a clock input connected to receive the recovered clock signal. A buffer interface may also be included to receive data from the link logic device in accordance with the recovered clock signal. The buffer interface may be a plurality of virtual lane buffers.

A method for compensating skew across a plurality of data interfaces includes writing data from each of the plurality of data interfaces into each of a plurality of deskew buffers in accordance with a clock signal from the respective data interface. Data is deskewed and read from the deskew buffers using a clock signal recovered from one of the plurality of data interfaces. The method may also include writing the data to a logic device using the recovered clock signal. Alternatively, the data may be written into an elastic buffer from the deskew buffers and then read at a local rate into the logic device.

Other objects and advantages of the invention will become apparent during the following description of the presently preferred embodiments of the invention taken in conjunction with the drawings.

Detailed Description of Specific Embodiment

A deskew apparatus may be used wherever multiple inputs at a same clock rate are received subject to skew. The inputs may be provided between devices in a computer or between computers. Such apparatus may be particularly adapted for use in connection with a network, including a local area network, system area network, or wide area network. An example of a network that may employ a deskew apparatus is defined by the Infiniband[SM] Trade Association. This association has recently developed a system area network known as the Infiniband[SM] architecture, the specification for which is incorporated herein by reference. The Inifiniband architecture defines a first order interconnect technology for interconnecting processor nodes and IO nodes and a hardware transport protocol sufficient to support reliable messaging (send/receive) without software intervention in the data movement path. This is accomplished through a point-to-point switched I/O fabric. Devices in the network interface with the fabric through one or more channel adaptors. Channel adapters are hardware devices comprising one or more ports.

The Infiniband architecture also defines a number of different communication modes including ×1, ×4 and ×12, and the channel adapters must be able to transmit and receive using any one of them. The ×1 mode uses a first physical lane, the ×4 mode uses the first and second through fourth physical lanes and the ×12 mode uses all twelve physical lanes.

Figure 1:
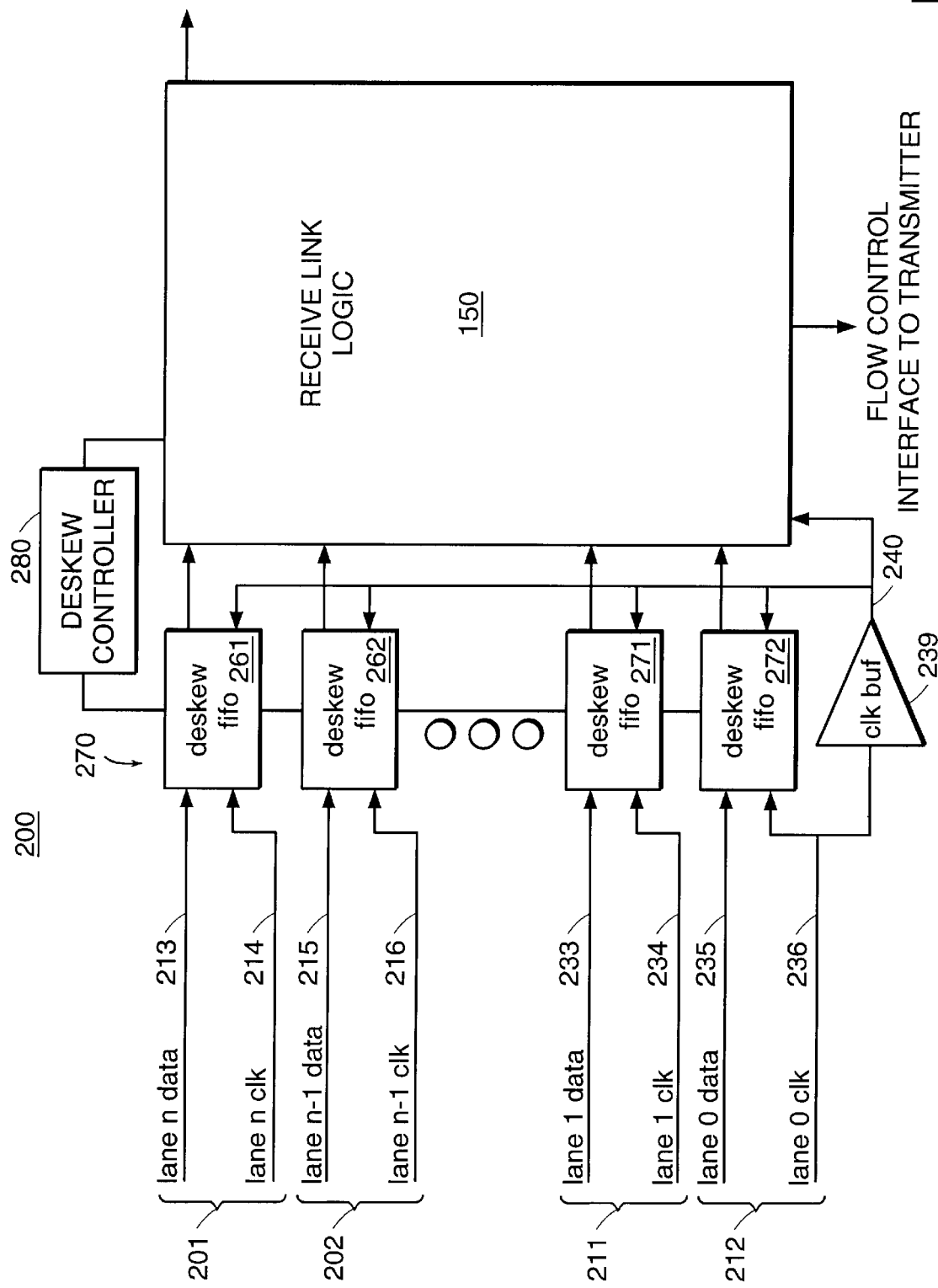
FIG. 1 is a schematic illustration of a deskew apparatus in accordance with an embodiment of the invention.

FIG. 1 shows apparatus 200 for providing deskew across a multitude of data inputs 201–212. Each input provides a data signal 213, 215, . . . 233, 235 and a clock signal 214, 216, . . . 234, 236 all at a same incoming clock rate. The apparatus 200 may be used for receiving any such collection of multiple inputs. In a particular embodiment, such apparatus 200 may be used in connection with a twelve lane interface such as that defined by the Infiniband architecture. The apparatus 200 includes a deskew interface 270 coupled to the data inputs 201–212. The deskew interface 270 includes a plurality of first in first out buffers 261–272.

The individual clock signals 214, 216, . . . 234 and 236 run at the same incoming frequency rate. However, there is no assurance that the clock signals 214, 216, . . . 234 and 236 will be phase aligned. Skew may be introduced in transit. In accordance with an embodiment of the invention, one of the individual clock signals from one of the data inputs, for example, data input 212, is coupled to the deskew interface 270 to serve as the recovered clock signal 240. If desired, the individual clock signal may be buffered by a simple buffer 239 to generate the recovered clock signal 240. In either case, the recovered clock signal 240 runs at the incoming frequency rate. In a specific embodiment suitable for Infiniband, the recovered clock signal is drawn from the physical lane commonly used in all modes, ×1, ×4 and ×12.

In the deskew interface 270, the data streams 213, 215, . . . 233 and 235 from all the data inputs are deskewed to the recovered clock signal 240. Each deskew buffer 261–272 receives data in accordance with its individual clock signal and outputs data in accordance with the recovered clock signal. The clock rates are the same into and out of the buffers. A deskew controller 280 starts and stops output from the deskew buffers individually to align all of the data streams removing any skew. The deskew controller 280 may operate in a conventional manner. The delay in starting a given deskew buffer is determined during training. The deskew controller 280 flushes all of the deskew buffers. All of the lanes are instructed to simultaneously send a recognizable training sequence. Upon recognizing the sequence in a buffer, the deskew controller 280 stops the flow of data through the buffer. This happens at each of the buffers at different times due to the skew. The delay is then known and can be compensated for by the deskew controller. A delay is determined for each deskew buffer so that the data output by the deskew buffers is thereafter aligned.

The recovered clock signal 240 may also be input to receive link logic device 150 so that data is received and transmitted by the receive link logic device 150 at the incoming clock rate. It should be noted that the recovered clock signal 240 may be input to any device coupled to the output of the deskew device so that such other devices also run at the incoming clock rate. The receive link logic device 150 may be any logic in a receive link for processing data that has been deskewed. In one embodiment, the receive link logic device 150 reviews incoming data and determines if retraining is required to eliminate skew that arose after the previous training session. The receive link logic device would thus work with the deskew controller.

Figure 2:
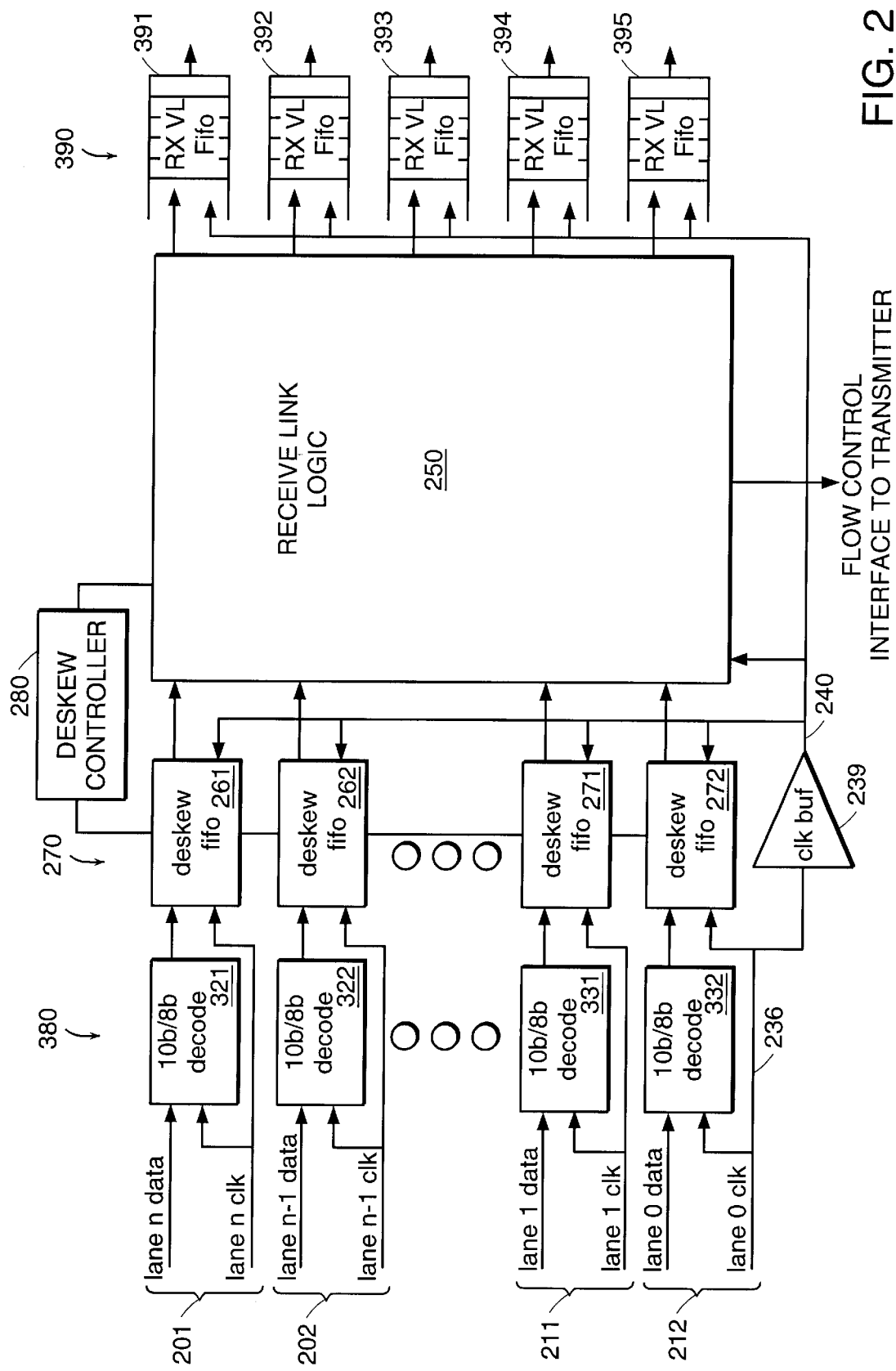
FIG. 2 is a schematic illustration of a deskew apparatus in accordance with a further embodiment of the present invention.

FIG. 2 is a schematic illustration of an apparatus for compensating skew and providing data to a data buffer interface in accordance with another embodiment of the present invention. A particular data buffer interface for use in this embodiment includes a plurality of virtual lane buffers. The use of virtual lanes is known, for example, in Infiniband. The Infiniband architecture support sixteen virtual lanes. The sixteenth lane is reserved for subnet management, while lanes one through fifteen may be used for data transport. Separate flow control is maintained over each data virtual lane such that excessive traffic on one virtual lane does not block traffic on another virtual lane. The embodiment of FIG. 2 includes a decode interface 380 and a virtual lane interface 390. The decode interface 380 includes a plurality of decode devices 321–332 that decode input data in accordance with the individual data interface's clock signal at the incoming clock rate. The decode devices serve to convert data by reversing the effect of any previous encoding such as that done by another system, network or network component. For example, one particular type of decoder makes a 10 b/8 b conversion. The data streams from the decode devices are written into the deskew interface 270 in accordance with the individual data interface's clock signal as described in connection with FIG. 1.

The recovered clock signal 240 from common lane clock 236 is used to deskew and regulate output of data from the deskew buffers 261, 262, . . . 271, 272. It is also fed into the receive link logic device 250, and the virtual lane interface 390. In this embodiment, the clock signal 236 from lane 212 has been chosen because it corresponds to the clock signal from the virtual lane corresponding to the ×1 mode and all of the modes, ×1, ×4, and ×12, use this lane. Thus, regardless of the mode, lane clock 236 will be present for use as the recovered clock signal 240.

The virtual lane interface 390 is comprised of a number of virtual lane buffers. In accordance with an Infiniband embodiment, there may be 1, 2, 4, 8 or 15 virtual data lanes each with an associated buffer. All such embodiments include an additional virtual lane for management functions. The receive link logic device 250 reads incoming packets which state to which virtual lane the data belongs. The receive link logic device 250 thus sends the data to its assigned virtual lane buffer. In the embodiment of FIG. 2, the receive link logic has its clock input connected to the recovered clock signal. Data is thus output to the virtual lane buffers in accordance with the recovered clock signal at the incoming clock rate. The virtual lanes each have their own flow control mechanism performed in cooperation between the receive link logic 250 and transmit logic. The flow control mechanism keeps track of available space in a virtual lane buffer. A message is transmitted to the sender with this information periodically. If a buffer is too full, the sender will slow or stop sending packets. If the buffer has sufficient available free space, the sender will be permitted to continue sending packets. This mechanism prevents overflowing the buffer and makes the read clock rate from the virtual buffers irrelevant. At the virtual lane interface 390 all training, skip, and idle sequences are dropped. Consequently, the virtual lane interface may receive data at a different rate from its output rate. As shown here, the virtual lane buffers 391–395 may include a plurality of first in first out queues. Ultimately, the virtual lane interface 390 allows for clock tolerance between the incoming clock rate and any other clock rate.

Figure 3:
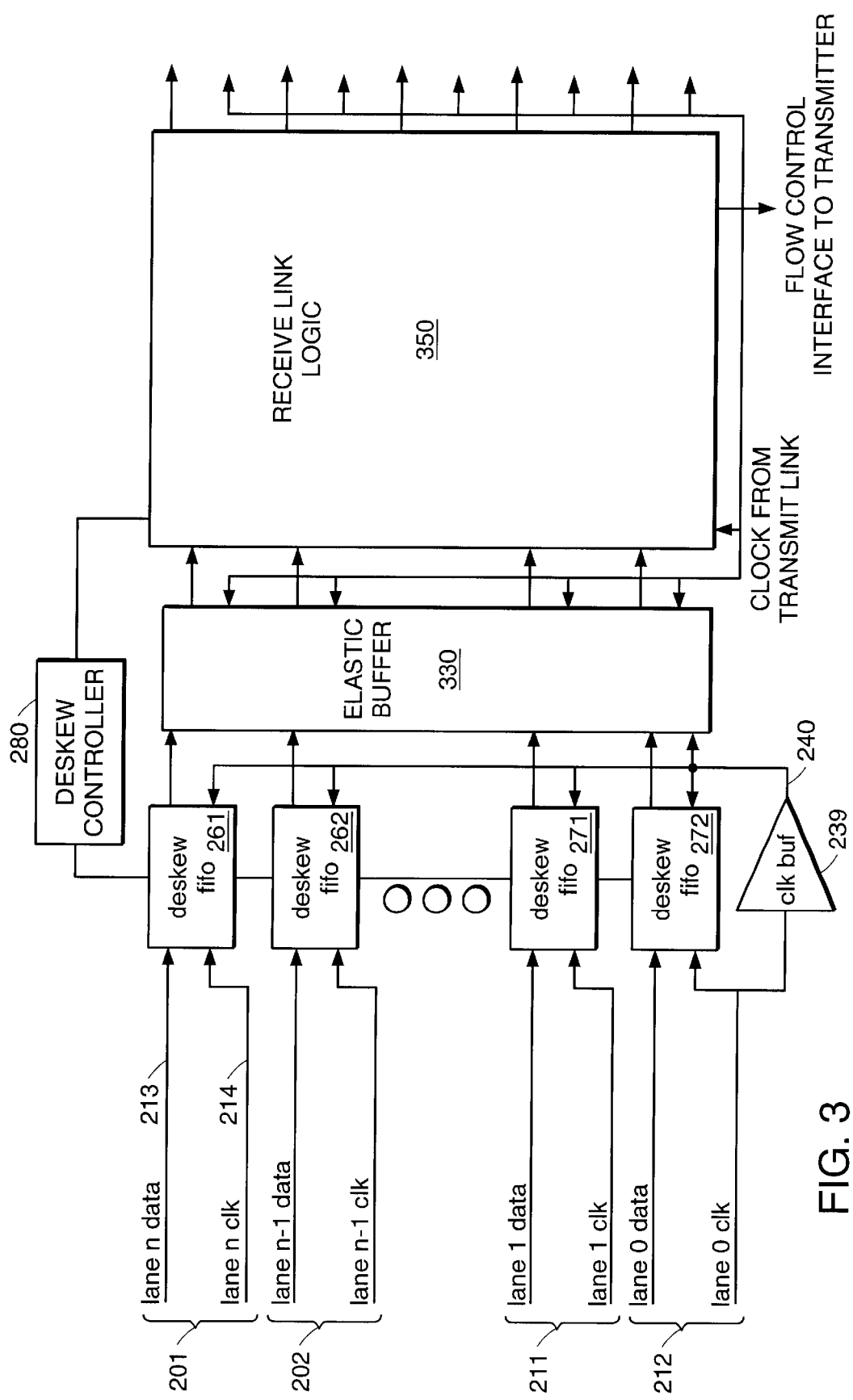
FIG. 3 is a schematic illustration of a deskew apparatus in accordance with a still further embodiment of the present invention.

It may be desirable in some receive links to run the receive link logic at a local clock rate as has been traditionally done. The recovered clock signal may still be used in deskewing and requesting output of data from the deskew buffers. Clock rate tolerance can be achieved by inserting an elastic buffer 330 between the deskew buffers 261, 262, . . . 271, 272 and the receive link logic device 350, as shown in FIG. 3. Data enters the elastic buffer 330 at the incoming rate in accordance with the recovered clock signal 240. The elastic buffer 330 identifies skip sequences and idle sequences that can be relied upon to avoid overflowing a lane of data. The local clock signal is used to regulate the output of data from the elastic buffer 330. In one embodiment, the local clock rate is the transmit clock used by a transmitter paired with the receive link. To the extent the receive link is used with virtual lanes, the receive link logic 350 communicates with the transmitter to manage flow control through the virtual lanes. In the embodiment using the elastic buffer 330, the local clock signal regulates the receive link logic 350 and any further devices. The clock rate of the local clock signal may differ from the incoming clock rate as the elastic buffer 330 has provided the necessary clock tolerance.

Figure 4:
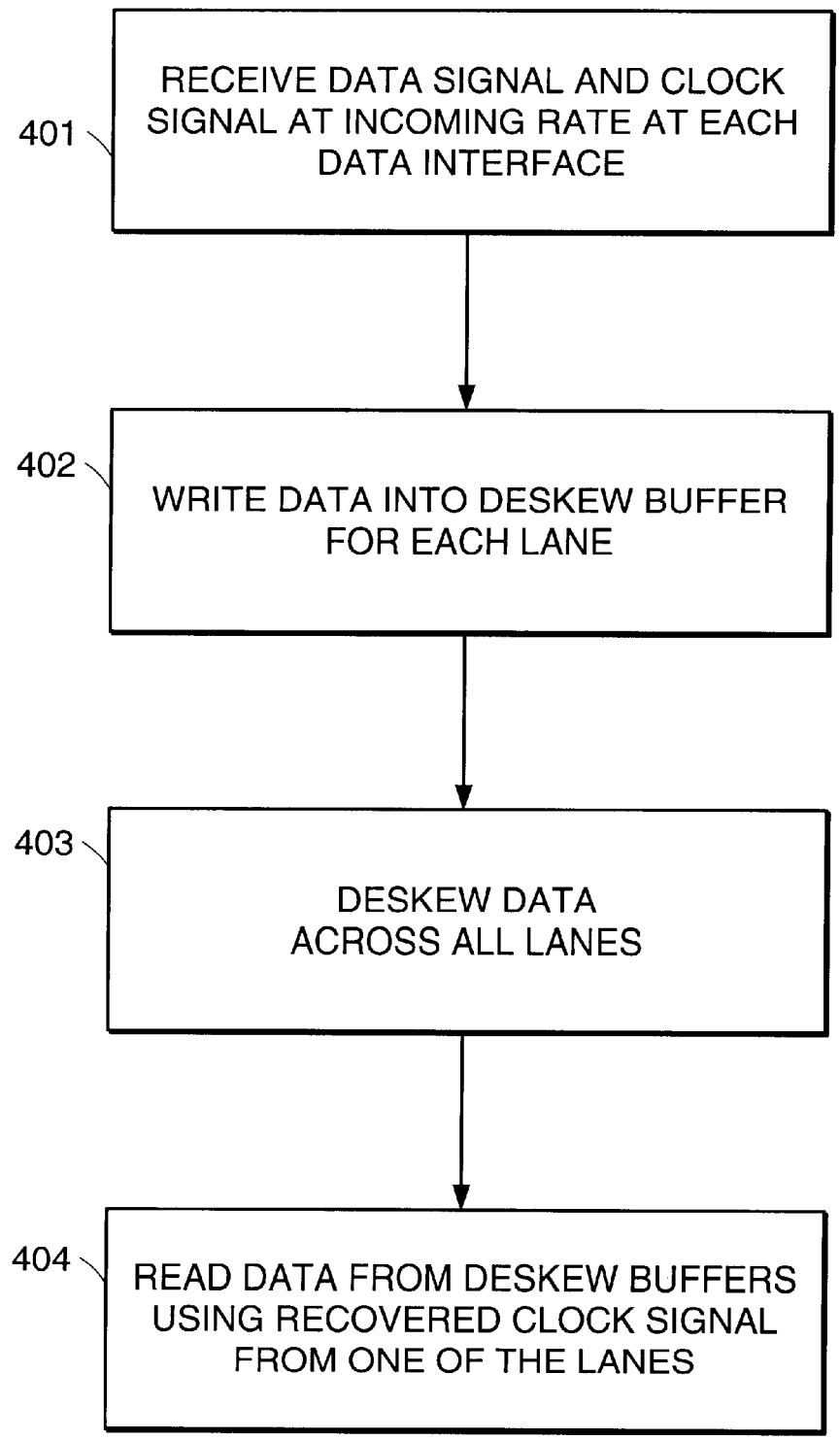
FIG. 4 is a flow chart illustrating a method for compensating skew across a plurality of data interfaces according to an embodiment of the invention.

FIG. 4 is a flow chart illustrating a method of compensating skew across a plurality of data interfaces. A data signal and a clock signal both at the incoming rate are received for each data interface 401. The incoming rate is the same for all the data interfaces. Data is written 402 into a deskew buffer in accordance with an individual data interface's clock signal. The data is deskewed across all of the buffers 403 with the help of the deskew controller. The deskew controller controls the start of data flow out of each of the deskew buffers to align all of the data signals. The data is read 404 from the deskew buffers using a clock signal recovered from one of the data interfaces. With all the clock signals and the recovered clock signal being at the same rate, an over run or under run of data is avoided because data is being written to the deskew interface at the same rate it is being read from the deskew interface. The data is read from the deskew interface 404 by a buffer interface, link logic device or other data consumer using the recovered clock signal. If the data is written into a clock tolerant device such as an elastic buffer, following devices may run at a local rate different from the incoming clock rate. For example, the local clock rate may be used by receive link logic and virtual lane buffers where the elastic buffer provides data at the local rate.

Although the embodiments hereinbefore described are preferred, many modifications and refinements which do not depart from the true spirit and scope of the invention may be conceived by those skilled in the art. For example, data may be received from any type of data input or transmit device and recovered clock signal may be drawn from any one of a plurality of data input clocks. As noted above, the data may be read from the deskew device or interface by a variety of data consumers or receive devices and the recovered clock signal would be fed to such devices accordingly.

It is intended that all such modifications, including but not limited to those set forth above, be covered by the following claims.

What is claimed is:

1. An apparatus for compensating skew across a plurality of data interfaces providing data at an incoming rate, the apparatus comprising:

a deskew buffer for each of the data interfaces, each deskew buffer coupled to its respective data interface to receive a data signal and a clock signal at the incoming rate;

a signal line coupled to one of the clock signals and all of said deskew buffers so as to provide a recovered clock signal to each of said deskew buffers, such that the output of data from all of the deskew buffers is deskewed and output in accordance with the recovered clock signal; and a link logic device configured to process the deskewed data output from the deskew buffers, wherein the link logic device has a clock input comprising the recovered clock signal.

2. An apparatus according to claim 1, further comprising a data buffer interface, connected to receive data from said link logic device at the incoming rate.

3. An apparatus according to claim 2 wherein said data buffer interface outputs data at a rate different from the incoming rate.

4. An apparatus according to claim 1 further comprising an elastic buffer interface coupled to receive data from said deskew buffers at the incoming rate.

5. An apparatus according to claim 4 further comprising a link logic device having a clock input connected to receive a clock signal running at a local clock rate and receiving data from said elastic buffer at the local clock rate.

6. A method for compensating skew across a plurality of data interfaces providing data at an incoming rate, the method comprising:

receiving a data signal and a clock signal at the incoming rate at each of said data interfaces;

for each data interface, writing data into a deskew buffer in accordance with the respective clock signal;

deskewing the data across all of the deskew buffers; and reading the data from the deskew buffers using a clock signal recovered from one of the clock signals at the incoming clock rate.

7. A method according to claim 6, further comprising writing the data from the deskew buffer to a link logic device using the recovered clock signal.

8. A method according to claim 7, further comprising writing data from the link logic device into a buffer interface using the recovered clock signal.

9. A method according to claim 8 further comprising reading data from the buffer interface at a different rate from the incoming rate.

10. A method according to claim 6 further comprising writing the data from the deskew buffers to an elastic buffer using the recovered clock signal.

11. A method according to claim 10 further comprising writing the data from the elastic buffer to a link logic device at a rate different from the incoming rate.

12. A receive link comprising:

a plurality of data inputs, each data input comprising a data signal and a clock signal;

a deskew interface coupled to receive the data signals and a clock signals at an incoming clock rate so that data is written into said deskew interface at the incoming clock rate, wherein the deskew interface comprises a deskew buffer for each of the data inputs; and a link logic device coupled to the deskew interface to receive deskewed data, having a clock input coupled to receive a clock signal at the incoming clock rate, wherein said link logic device is configured to determine if a need for retraining said deskew interface arises.

13. A receive link according to claim 12, wherein the deskew interface further comprises a decode device, the decode device decoding data and providing the decoded data in the data signal to the deskew buffers.

14. A receive link according to claim 12 wherein the data signal and the clock signal are each one of a plurality of data signals and clock signals and said deskew interface comprises a plurality of first-in first-out buffers in order to remove skew from among the plurality of data signals.

15. A receive link according to claim 14 further comprising a deskew controller for starting and stopping data output from said first-in first-out buffers in order to remove skew from among the plurality of data signals.

16. A receive link according to claim 15 further comprising a signal line drawing one of the plurality of clock signals to serve as a recovered clock signal into each of the first-in first-out buffers to regulate the output of data from said buffers.

17. A method for compensating skew across a plurality of data inputs, the method comprising:

receiving a data signal and a clock signal at a same incoming rate from each of said data inputs;

writing the data signal from each data input into a deskew buffer in accordance with the respective clock signal for the data input;

deskewing the data across all of the deskew buffers; and operating link logic associated with the plurality of deskew buffers on a clock signal recovered from one of the data inputs.

18. A method according to claim 17, further comprising writing data from said link logic to an output interface using the clock signal recovered from the data input.

19. A method according to claim 17 further comprising outputting data from the deskew buffers to the link logic using the clock signal recovered from the data input.

20. An apparatus for compensating skew across a plurality of data inputs comprising:

a plurality of deskew buffers, each receiving one of the data inputs and a clock signal corresponding to the data input, each clock signal running at a same incoming clock rate;

a signal line coupling one of the clock signals to each of said deskew buffers to regulate output of data from said deskew buffers in accordance with the one of the clock signals;

a plurality of virtual lane buffers; and link logic coupled between said plurality of virtual lane buffers and said deskew buffers for directing data individually to an appropriate one of said virtual lane buffers with one of the clock signals.

21. An apparatus according to claim 20 wherein the one of the clock signals is from a data input common to all modes of transmission over said data inputs.

22. An apparatus according to claim 20 further comprising an elastic buffer coupled between said deskew buffers and said link logic.

23. An apparatus according to claim 20 wherein the one of the clock signals is coupled to said link logic to run said link logic in accordance with the same incoming clock rate.

* * * * *